(12) United States Patent
Porter et al.

(10) Patent No.: US 6,499,717 B1
(45) Date of Patent: Dec. 31, 2002

(54) SYSTEM AND METHOD OF USE FOR A REFRIGERANT QUICK-CONNECT COUPLING

(75) Inventors: Donald W. Porter, Highland, NY (US); Mark A. Marnell, Kingston, NY (US); Steven J. Mazzuca, New Paltz, NY (US); Budy D. Notohardjono, Poughkeepsie, NY (US); Roger R. Schmidt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 09/722,961

(22) Filed: Nov. 27, 2000

(51) Int. Cl.[7] ............................ F25B 45/00; F16L 21/00
(52) U.S. Cl. .................. 251/142; 251/145; 251/209; 251/345; 62/292; 137/599.02
(58) Field of Search .................. 251/149.2, 142, 251/145, 149.5, 205, 206, 207, 208, 209, 343, 344, 345; 62/77, 292, 298, 299; 137/599.02, 599.16, 599.17, 637.05, 637.1

(56) References Cited

U.S. PATENT DOCUMENTS

| | | | |
|---|---|---|---|
| 117,853 A | | 8/1871 | Allen ........................ 251/352 |
| 2,143,565 A | | 1/1939 | Minea ..................... 251/207 X |
| 2,855,954 A | | 10/1958 | Lamar et al. .......... 137/599.17 |
| 3,589,673 A | * | 6/1971 | Cruse ..................... 251/149.1 |
| 3,804,119 A | | 4/1974 | Christensen ............ 251/209 X |
| 3,805,838 A | * | 4/1974 | Christensen ............ 251/209 X |
| 4,069,686 A | * | 1/1978 | Hoelman ..................... 62/292 |
| 4,108,475 A | * | 8/1978 | Fleischer ............. 251/149.2 X |
| 4,109,683 A | * | 8/1978 | Strache ................... 251/205 X |
| 4,214,728 A | | 7/1980 | Fleischer ................. 251/149.2 |
| 4,366,816 A | | 1/1983 | Bayard et al. ........ 251/149.5 X |
| 4,466,461 A | * | 8/1984 | Weiss ..................... 251/344 X |
| 4,649,955 A | | 3/1987 | Otto et al. ............. 137/625.13 |
| 5,080,132 A | * | 1/1992 | Manz et al. .............. 62/292 X |
| 5,915,402 A | * | 6/1999 | Mitchell, II ............... 62/292 X |

* cited by examiner

Primary Examiner—Henry C. Yuen
Assistant Examiner—Eric Keasel
(74) Attorney, Agent, or Firm—Floyd A. Gonzalez; Cantor Colburn LLP

(57) ABSTRACT

A method of use and apparatus for a quick connect coupling in a fluid system as disclosed herein. The quick connect coupling includes a female coupling assembly and a male coupling assembly. The female coupling assembly includes a female cone housing nestable with a female cone. At least one female flow hole is formed in each of the female cone housing and female cone. The male coupling assembly has a male cone housing nestable with a male cone. At least one male flow hole is formed in each of the male cone housing, and the male cone. The at least one female flow hole rotatably misaligns to seal in a manner that fluid is contained from leaking past the female coupling assembly. The at least one male flow hole rotatably misaligns to seal in a manner that fluid is contained from leaking past the male coupling assembly. The male coupling assembly is removably rotatably insertable into the female cone. The female coupling assembly and the male coupling assembly rotatably fluidly couple to create a fluid flow path through the quick connect coupling. The female coupling assembly and the male coupling assembly rotatably fluidly uncouple, thereby sealing the fluid flow path through the quick connect coupling. The male coupling assembly and the female coupling assembly are removably uncoupleable.

28 Claims, 4 Drawing Sheets

SYSTEM AND METHOD OF USE FOR A REFRIGERANT QUICK-CONNECT COUPLING

BACKGROUND OF THE INVENTION

Quick-connect coupling devices for joining two hoses together in a sealable manner are well known in the art. They are of relatively complex construction and include finely machined surfaces which are subject to wear, and generally comprise two pieces. A socket member is one piece, and a plug member is the other piece. The plug member is adapted to fit into the socket member in a male to female fashion. These members are formed of materials that wear after repeated use and are constructed in designs that inherently wear the sealing surfaces. The wear usually manifests in increased tolerances between sealing surfaces of the pressure boundary of the coupling. Ultimately, the coupling pressure boundary formed by the sealing surfaces fails resulting in system leakage.

In many fluid applications, leakage of the system fluid is unacceptable. In the refrigeration industry smaller refrigeration systems require lower leak rates. This is not only for a cleaner environment, but because the smaller system has less capacity to compensate for system refrigerant losses. Consequently, the smaller refrigeration systems that have a low refrigerant volume require system equipment with low leak rates. The couplings in these systems must also have fewer failure mechanisms that allow leakage from the fluid system. Accordingly, there exists a need for a high reliability self-sealing refrigerant coupling.

SUMMARY OF THE INVENTION

A method of use and apparatus for a quick connect coupling in a fluid system as disclosed herein. The quick connect coupling includes a female coupling assembly and a male coupling assembly. The female coupling assembly includes a female cone housing nestable with a female cone. At least one female flow hole is formed in each of the female cone housing and female cone. The male coupling assembly has a male cone housing nestable with a male cone. At least one male flow hole is formed in each of the male cone housing, and the male cone. The at least one female flow hole rotatably misaligns to seal in a manner that fluid is contained from leaking past the female coupling assembly. The at least one male flow hole rotatably misaligns to seal in a manner that fluid is contained from leaking past the male coupling assembly. The male coupling assembly is removably rotatably insertable into the female cone. The female coupling assembly and the male coupling assembly rotatably fluidly couple to create a fluid flow path through the quick connect coupling. The female coupling assembly and the male coupling assembly rotatably fluidly uncouple, thereby sealing the fluid flow path through the quick connect coupling. The male coupling assembly and the female coupling assembly are removably uncoupleable.

BRIEF DESCRIPTION OF THE DRAWINGS

Referring now to the exemplary drawings wherein like elements are numbered alike in the several FIGURES.

DETAILED DESCRIPTION OF THE PREFERRED EMBODIMENTS

Figure 1:
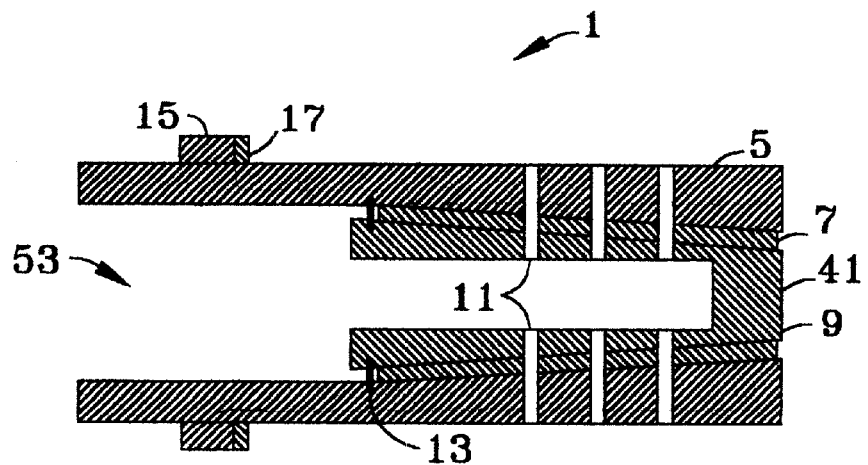
FIG. 1 is a cross sectional view of an exemplary diagram of a male coupling assembly.
Figure 6:
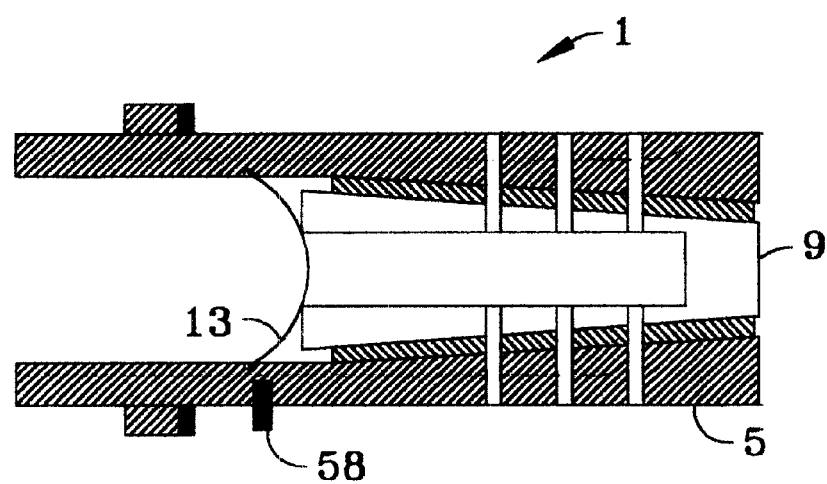
FIG. 6 is a cross sectional view of an exemplary diagram of another embodiment of a male coupling member.

Referring now to the drawings, FIG. 1 is a diagram of a cross section of an embodiment of a male coupling assembly 1. The male coupling assembly 1 or (plug member) is typically attached to a conduit, pipe, hose or tubing of a fluid system (not shown). In a preferred embodiment the male coupling assembly 1 is attached to a refrigerant system conduit. The male coupling assembly 1 is attached so that it has a male coupling assembly tip 41 unattached and distal from the system conduit and the male cone housing cavity 53 in communication or fluidly coupled to and proximate to the system conduit (not shown). The male coupling assembly 1 has a male cone housing 5. The male cone housing 5 is formed to be receivably inserted or nested into a female coupling 3, such as the one embodied in FIG. 2. The male cone housing 5, in the embodiment of FIG. 1, is substantially a right circular cylinder shape. The male cone housing 5 is not limited to a right circular cylinder shape. The male cone housing cavity 53 is formed by the male cone housing 5. A male seal ring 15 is formed or disposed on the male cone housing 5. The male seal ring 15 is formed such that it can receivably mate or seal with a male cone housing seal 17. The male seal ring is also formed in order to couple with a seal mechanism 43 (see FIG. 4 and FIG. 8). The male seal ring 15 is made of a material that has a surface hardness less than the second washer 55 of the seal mechanism 43 (see FIG. 7). With a soft surface hardness, the male seal ring 15 can deform around the second washer 55 to form part of a high reliability seal 51 to be discussed in more detail below (see FIG. 4). The male cone housing seal 17 is disposed on the male cone housing 5 to receivably seal the pressure boundary of the coupled male coupling assembly 1 and the coupled female coupling assembly 3 (see FIG. 3). The male cone housing seal 17 can be made of materials that are suitable for sealing fluids at the desired temperatures and pressures and material composition of the working fluid. Disposed through the male cone housing 5 are male flow holes 11 or orifices or passages or slots. The male flow holes are formed in the male cone housing 5 in any manner suitable. There can be one male flow hole 11 or a plurality of male flow holes 11 disposed in a variety of configurations or shapes in the male cone housing 5 to provide a plurality of fluid flow characteristics. A male cone 9 is receivably disposed in the male cone housing 5. The male cone 9 may also be nestable with the male cone housing 5. The male cone 9 is substantially conical in shape in the embodiment depicted in the figures. The male cone 9 is not limited to a conical shape. In an other embodiment the male cone 9 may be cylindrical in shape. Disposed through the male cone 9 is a male flow hole 11 or slot or passage or orifice. There may be a plurality of male flow holes 11 disposed through the male cone 9. In the embodiment in the figures a plurality of male flow holes 11 are shown. In a preferred embodiment, the male coupling assembly tip 41 has a coupling means such as holes or indents disposed within to facilitate coupling with cone alignment pins 27 (see FIG. 2). The male cone 9 is rotatably received by the male cone housing 5. The male cone 9 rotates relative to the male cone housing 5. The male cone 9 rotatably aligns, so that the plurality of male flow holes 11 disposed in the male cone 9 align with the plurality of male flow holes 11 disposed in the male cone housing 5. In other words, the male cone 9 rotates in one direction such that the male flow holes fluidly couple and the male cone 9 rotates in another (opposite) direction to fluidly uncouple. The male cone 9 rotatably misaligns, so that the plurality of male flow holes 11 disposed in the male cone 9 do not align with the plurality of male flow holes 11 disposed in the male cone housing 5. A male cone seal 7 is disposed around the male cone 9 to seal between the male cone 9 inserted into the male cone housing 5. The male cone seal 7 may be attached to the male cone 9 or to the male cone housing 5. The male cone seal 7, in some embodiments, can be glued or pined to the male cone 9. The male cone seal 7 has a plurality of male flow holes 11 disposed throughout. The male cone 9, the male cone seal 7, and the male cone housing 5 rotatably align to allow the male flow holes 11 disposed on each of the male cone 9, the male cone seal 7, and the male cone housing 5 to align, thus allowing fluid to pass through (fluidly coupling) the coupled components. A working fluid such as in the preferred embodiment, refrigerant, may flow through the male cone 9, the male cone seal 7, and the male cone housing 5 when the male flow holes 11 are aligned and the male coupling assembly 1 is attached to a pressurized refrigerant system. When the male coupling assembly 1 is pressurized by a fluid system and the male flow holes 11 are out of alignment or misaligned such that the fluid in the system is sealed and cannot flow (fluidly uncoupled), the male cone 9 is forced by fluid pressure against the male cone seal 7 and the male cone housing 5. This force wedges the male cone 9 into the male cone seal 7 and into the male cone housing 5. The male cone seal 7 is compressed by the fluid pressure wedging the male cone 9 into the male cone housing 5. A male cone retention clip 13 is attached to the male cone housing 5 and to the male cone 9. The male cone retention clip 13 acts to retain the coupled members together. FIG. 1 and FIG. 6 show different embodiments of the male cone retention clip 13. The male cone retention clip 13 holds the male cone 9 inside the male cone housing 5 while maintaining freedom of rotation between the male cone 9 and the male cone housing 5.

Figure 2:
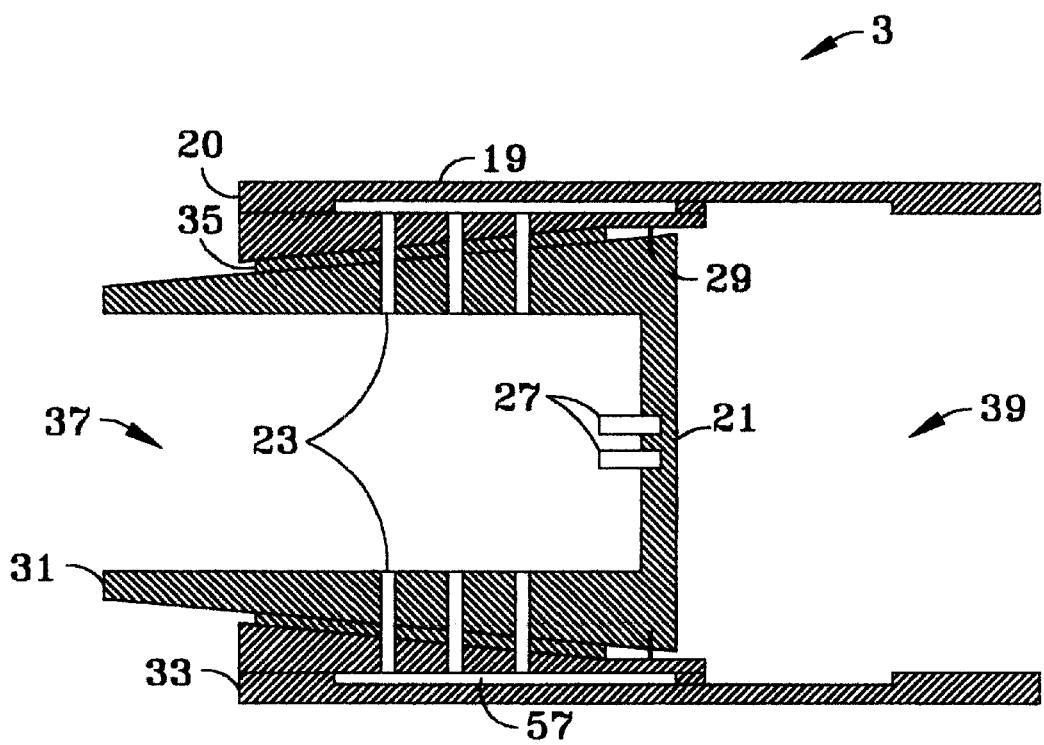
FIG. 2 is a cross sectional of an exemplary diagram of a female coupling assembly.
Figure 5:
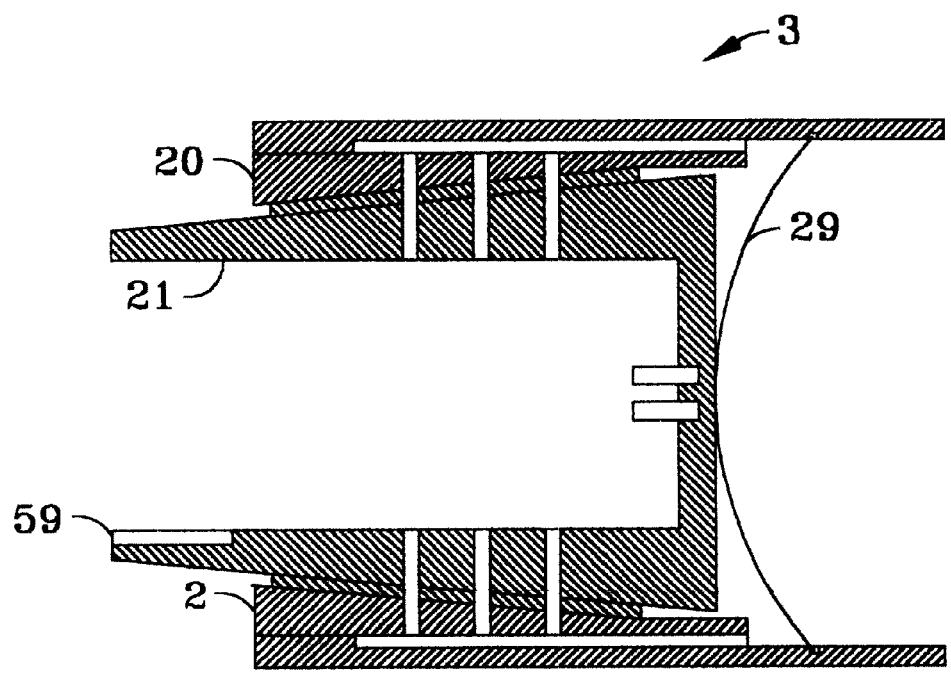
FIG. 5 is a cross sectional view of an exemplary diagram of another embodiment of a female coupling member.

Turning now to FIG. 2, an embodiment of a female coupling assembly 3 is shown. The female coupling assembly 3 or (socket member) is adapted to attach to a fluid system conduit, such as a tube, hose or pipe (not shown). The female coupling assembly 3 attaches to a conduit so that the female shell cavity 39 is proximate to the conduit and the female cone cavity 37 is distal from the conduit and free to receive the male coupling assembly 1. The female shell cavity 39 is formed in the female shell 19 or in some embodiments the female shell cavity is formed in a female cone housing 20. The female cone cavity 37 is formed in the female cone 21. The female shell 19 is disposed around a female socket 2. The female shell 19 in the preferred embodiment is cylindrical in shape although in other embodiments it is not limited to a cylindrical shape. The female socket 2 and female shell 19 in one embodiment may be formed from a common member called a female cone housing 20 (also see FIG. 5). The female cone housing 20 is formed to be an alternative to the combined female shell 19 and female socket 2. In the preferred embodiment, the female shell 19 is disposed around the female socket 2 and forms a female flow cavity 57 for allowing fluid to flow through the two elements. In this embodiment, the two elements forming the female flow cavity 57 are sealed together such that fluid flows through the female flow cavity 57 and does not leak past the common seams where the female shell 19 and the female socket 2 are joined. The female cone housing 20 (or female socket 2) has orifices, slots or passages or female flow holes 23 disposed throughout for allowing fluid flow. The female flow holes 23 communicate with the female flow cavity 57. The female flow holes 23 are formed in the female cone housing 20 (or female socket 2) in any manner suitable. There can be one female flow hole 23 or a plurality of female flow holes 23 disposed throughout the female cone housing 20 in a variety of shapes or configurations to provide a plurality of fluid flow characteristics. A female cone 21 is receivably disposed in the female cone housing 20 or alternatively the female socket 2. The female cone 21 is nestable within the female cone housing 20 or in an alternative embodiment the female socket 2. The female cone 21 is substantially conical in shape in the embodiment depicted in the figures. The female cone 21 is not limited to a conical shape. In another embodiment, the female cone 21 is cylindrical in shape. Disposed through the female cone 21 are female flow holes 23. There may be one or a plurality of female flow holes 23 disposed throughout the female cone 21. In the embodiment in the figures, a plurality of female flow holes 23 are shown. In a preferred embodiment, the female cone 21 has a coupling means or cone alignment pins 27 disposed within to facilitate coupling with a coupling means disposed in the male coupling assembly tip 41 (see FIG. 1). There may be one or a plurality of cone alignment pins 27. The female cone 21 is rotatably received by the female cone housing 20. The female cone 21 rotates relative to the female cone housing 20. The female cone 21 rotatably aligns, so that the plurality of female flow holes 23 disposed in the female cone 21 align with the plurality of female flow holes 23 disposed in the female cone housing 20. The female cone 21 rotatably misaligns, so that the plurality of female flow holes 23 disposed in the female cone 21 do not align with the plurality of female flow holes 23 disposed in the female cone housing 20. In other words, rotation of the female cone 21 in one direction fluidly couples the female flow holes 23 and rotation in another (opposite) direction fluidly uncouples the female flow holes 23. In some embodiments, a female cone seal 35 is disposed around the female cone 21 to seal between the female cone 21 inserted into the female cone housing 20. The female cone seal 35 may be attached to the female cone 21. The female cone seal 35, in some embodiments, can be glued or pined to the female cone 21 or to the female cone housing 20 or the female socket 2. The female cone seal 35 has a plurality of female flow holes 23 disposed throughout. The female cone 21, the female cone seal 35, and the female cone housing 20 rotatably align to allow the female flow holes 23, disposed on each of the female cone 21, the female cone seal 35, and the female cone housing 20, to align thus allowing fluid to pass through (fluidly coupling) the coupled components. A working fluid such as in the preferred embodiment, refrigerant, may flow through the female cone 21, the female cone seal 35, and the female cone housing 20 when the female flow holes 23 are aligned and the female coupling assembly 3 is attached to a pressurized refrigerant system. When the female coupling assembly 3 is pressurized by a fluid system and the female flow holes 23 are out of alignment or misaligned such that the fluid in the system is sealed and cannot flow (fluidly uncoupled), the female cone 21 is forced by fluid pressure against the female cone seal 35 and the female cone housing 20. This force wedges the female cone 21 into the female cone seal 35 and into the female cone housing 20. The female cone seal 35 is compressed by the fluid pressure wedging the female cone 21 into the female cone housing 20. A female cone retention clip 29 is attached to the female cone housing 20 and to the female cone 21. The female cone retention clip 29 acts to retain the coupled members together. FIG. 2 and FIG. 5 show different embodiments of the female cone retention clip 29. The female cone retention clip 29 holds the female cone 21 inside the female cone housing 20 while maintaining freedom of rotation between the female cone 21 and the female cone housing 20. A female seat 31 is disposed on the female cone 21 to couple with the male cone housing seal 17. In the preferred embodiment, the female seat 31 is located distal from the cone alignment pins. The female seat 31 is proximate to the male seal ring 15 when the male coupling assembly 1 is inserted into the female coupling assembly 3. The female seat 31 and the male seal ring 15 with the male cone housing seal 17 disposed between, form a pressure boundary that inhibits fluid leakage past the coupled male coupling assembly 1 and female coupling assembly 3. A female soft seat 33 is disposed on the female cone housing 20 or in an alternative, on the female shell 19. The female soft seat 33 couples to the seal mechanism 43 to form part of the high reliability seal 51 (see FIG. 3). The female soft seat, in a preferred embodiment, is made of a soft metal material that has a surface hardness that is less than the hardness of the first washer 45. The soft surface will deform under the pressure load of the harder first washer. This union, the first washer 45 and the female soft seat 33, form a pressure boundary to inhibit fluid leakage from the coupled male coupling assembly 1 and the female coupling assembly 3.

Figure 3:
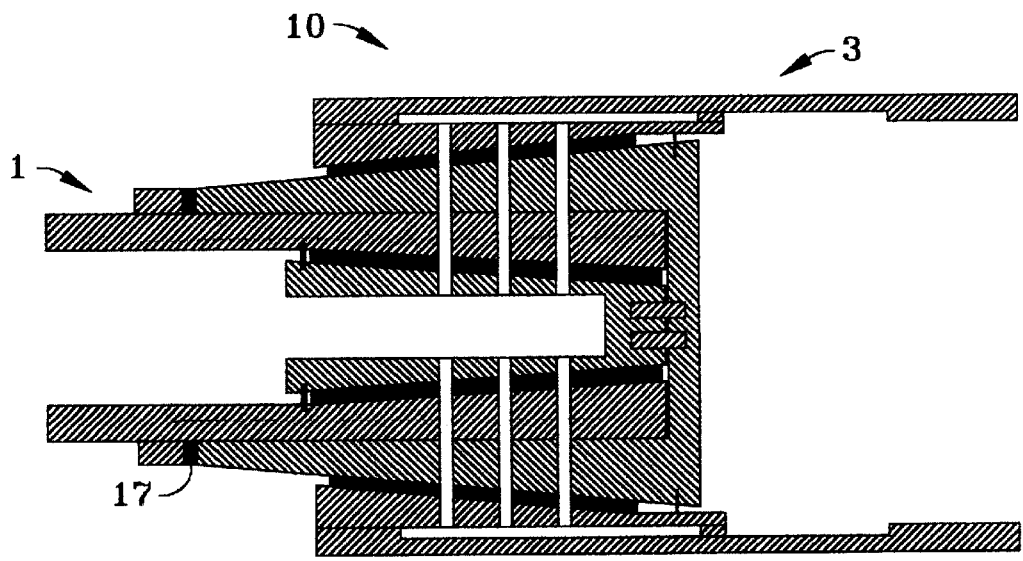
FIG. 3 is a cross sectional view of an exemplary diagram of a quick connect coupling.

Turning to FIG. 3, the male coupling assembly 1 and the female coupling assembly 3 are shown coupled or (plug and socket). The quick connect coupling 10 is made up of the coupled male coupling member 1 and the female coupling member 3. The quick connect coupling 10 is capable of being adaptable for use with small diameter tubing. The quick connect coupling 10 can be scaled down for use with tubing as small as about ¼ inch diameter. In the embodiment shown in FIG. 3, the two couplings have been rotatably aligned in order to provide fluid passage (fluidly coupled) through the quick connect coupling 10. The cone alignment pins 27 received by the male coupling assembly tip 41 interlock the male cone 9 and the female cone 21 facilitating rotatable alignment of the male flow holes 11 and the female flow holes 23. The male cone 9 and the female cone 21 are rotated in unison (interlocked) or fixed relative to each other so that there is minimal relative motion between the two members and as they are rotated relative to the female cone housing 20 (in an alternate embodiment the female shell 19 and female socket 2) which is fixed relative to the interlocked rotating female cone 21 and male cone 9. The male cone housing 5 is also fixed relative to the interlocked rotating female cone 21 and male cone 9. In one embodiment, the female cone 21 may be mechanically manipulated to rotate the interlocked male cone 9 and female cone 21 relative to the fixed male cone housing 5 and fixed female cone housing 20 (or stationary female socket 2 and female shell 19). In another embodiment, both of the female cone housing 20 and the male cone housing 5 are interlocked relative to each other. The alignment of the male flow holes 11 with the female flow holes 23 fluidly couples the male coupling assembly 1 and the female coupling assembly 3. Conversely, the misalignment of the male flow holes 11 with the female flow holes 23 fluidly uncouples (seals) the male coupling assembly 1 and the female coupling assembly 3. With both the male coupling assembly 1 and the female coupling assembly 3 coupled and system fluid pressurized, the quick connect coupling 10 is sealed by the male cone seal 7, the male cone housing seal 17, and the female cone seal 35.

Figure 4:
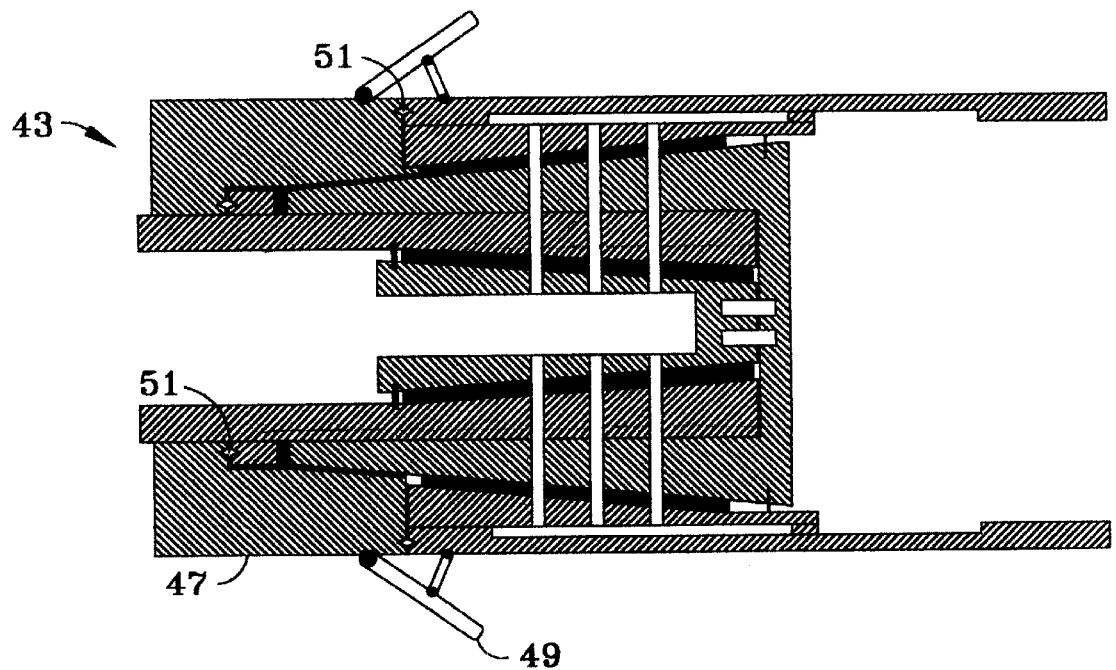
FIG. 4 is a cross sectional view of an exemplary diagram of a quick connect coupling with a seal mechanism attached.
Figure 7:
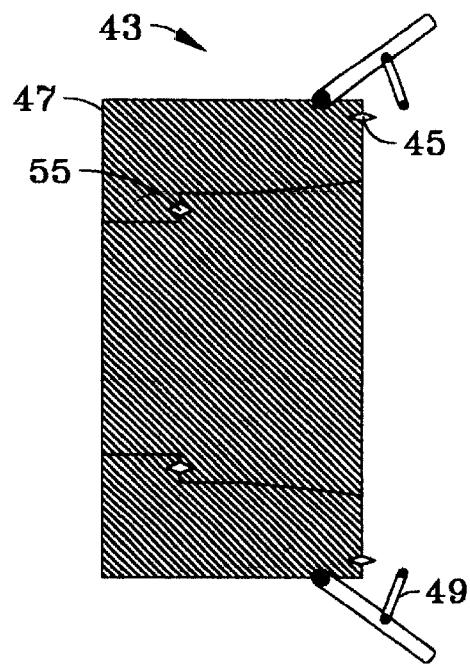
FIG. 7 is a cross sectional view of an exemplary diagram of a seal mechanism.

FIG. 4 shows another embodiment with the addition of the seal mechanism 43 to the quick connect coupling 10. The seal mechanism 43 is coupled to the female coupling assembly 3 and the male coupling assembly 1. The seal mechanism 43 interlocks (fixes together relatively substantially in unison) the female coupling assembly 3 and the male coupling assembly 1. The seal mechanism 43 minimizes fluid leakage from the quick connect coupling. With the seal mechanism 43 coupled to the male coupling assembly and the female coupling assembly 3, a high reliability seal 51 is formed. The high reliability seal 51, is formed at the interfaces of the seal mechanism 43 and the male coupling assembly 1 and the female coupling assembly 3. In the preferred embodiment, the high reliability seal 51 provides the quick connect coupling 10 the capability to maintain very low leak rates on the order of less than 0.1 ounce per year (oz./yr.) for a working fluid such as refrigerant. As shown in FIG. 7, the seal mechanism 43 has a shroud body 47. The shroud body is formed to receivably couple with the male coupling assembly 1 and the female coupling assembly 3. A cam mechanism 49 is disposed on the shroud body 47 in a manner that it can couple with the female cone housing 20 (or female shell 19). In a preferred embodiment the cam mechanism 49 is a pin-in-slot cam design. The cam mechanism 49 may couple with the female cone housing 20 (or female shell 19) in any fashion depending on the materials used. As discussed above, the seal mechanism has a first washer 45 and a second washer 55 disposed between the shroud body 47 and the female coupling assembly 3 and the male coupling assembly 1, respectively. In a preferred embodiment, the first washer 45 is (disposed) inserted between the shroud body 47 and the female soft seat 33, and the second washer 55 is disposed between the shroud body 47 and the male seal ring 15. The cam mechanism seats the seal mechanism 43 by driving the first washer 45 into the softer surfaces of the shroud body 47 and the female soft seat 33, and by driving the second washer 55 into the softer surfaces of the shroud body 47 and the male seal ring 15. In one embodiment, the first washer 45 and the second washer 55 form lozenge cross sections (diamond shape). The leak path for the working fluid is minimized by the seal mechanism 43.

FIG. 5 and FIG. 6 show alternate embodiments of the female coupling assembly 3 and the male coupling assembly 1, respectively. The female cone retention clip 29 is shown in an alternate embodiment. The female cone retention clip 29 is shown as a continuous flexed member providing a bias to maintain the female cone 21 inserted into the female cone housing 20 (or female shell 2). In the FIG. 6, an alternate embodiment of the male cone retention clip 13 is shown. The male cone retention clip 13 is shown as a continuous flexed member providing a bias to maintain the male cone 9 inserted into the male cone housing 5. In the embodiment shown in FIG. 5, a coupling slot 59 is formed in the female cone 21. The coupling slot 59 can be disposed about the circumference or a substantial length of the circumference of the female cone 21. In a preferred embodiment the coupling slot 59 is formed in the shape of an "L" slot. The coupling slot 59 maintains the male coupling assembly 1 and the female coupling assembly 3 coupled. FIG. 6 shows an embodiment with a coupling pin 58 disposed or formed in the male cone housing 5. The coupling pin 58 is receivably inserted into the coupling slot 59 to mechanically couple the quick connect coupling 10. In another embodiment, the coupling slot 59 may removably receive the coupling pin 58 and interlock the male coupling assembly 1 and the female coupling assembly 3 by rotatably interlocking the coupling pin 58 into the coupling slot 59. In a preferred embodiment, the "L" shaped coupling slot 59 removably receives the coupling pin 58 such that the coupling pin 58 receivably inserts into the "L" slot shape until it bottoms/abuts the corner of the "L" shape. At that location, the male coupling assembly tip 41 and the cone alignment pins 27 have docked and interlocked. Then, as the interlocked male cone 9 and female cone 21 are rotated, the coupling pin 58 slides, or moves in the coupling slot 59 along the short leg of the "L" shape in an arc of the circumference of the female cone 21. The coupling pin 58 can rest/stop at the end of short leg of the "L" shape and provide a reference to indicate that the female flow holes 23 and the male flow holes 11 have aligned. The rotation may be accomplished, in one embodiment, by the use of a simple pin-in-hole tool that inserts into a hole or indent disposed in the female cone 21 and then is used as a lever to rotate the interlocked male cone 9 and female cone 21. Another embodiment can be (similar to a drill chuck), a gear mechanism, with beveled gear teeth formed in the female cone 21 and mating beveled pinion gear on a shaft lever tool inserted into a hole formed in the female cone housing 20 (or female socket 2). Rotation of the pinion gear translates to rotation of the female cone 21 interlocked with the male cone 9, relative to the female cone housing (or female socket 2).

Figure 8:
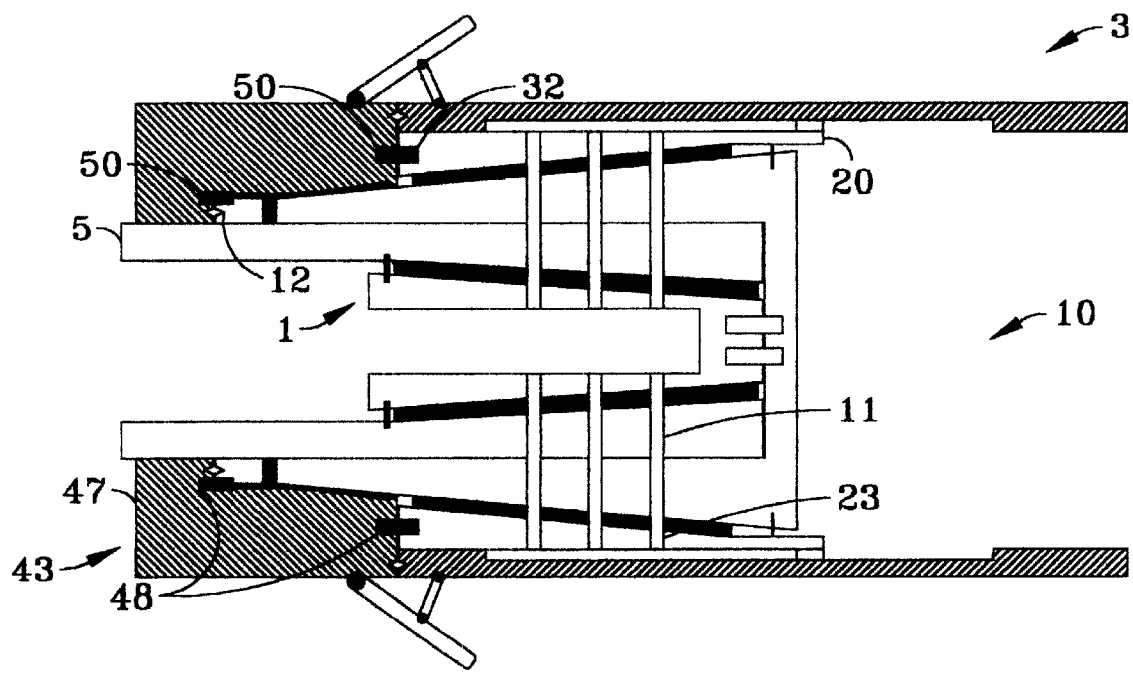
FIG. 8 is a cross sectional view of an exemplary diagram of a quick connect coupling with an alternate embodiment of the seal mechanism attached.

FIG. 8 shows another embodiment of the quick connect coupling 10 with the seal mechanism 43. The seal mechanism 43 in FIG. 8 has the same basic elements as the embodiment in the FIG. 7 seal mechanism 43 with the addition of interlocking aligning means. The seal mechanism 43 embodiment of FIG. 8 performs the same functions as the seal mechanism 43 of FIG. 7, with the addition of acting as a locator device to dock and align the male coupling assembly 1 and the female coupling assembly 3. As shown in the FIG. 8 embodiment, the seal mechanism 43 uses a pin-in-hole or pin-in-slot arrangement to align and dock or couple the seal mechanism 43 and the female coupling assembly 3 and the male coupling assembly 1. Any coupling means can be used to interlock or align in a particular fashion the seal mechanism 43 and the female coupling assembly 3 and the male coupling assembly 1. In the embodiment shown in FIG. 8, the seal mechanism 43 has a shroud body 47 with one or more seal mechanism aperture 48 formed in the shroud body 47. An pin 50 is disposed in or formed in the seal mechanism aperture 48. A corresponding female interlock aperture 32 is formed in the female cone housing 20 (or alternatively female socket 2). A male interlock aperture 12 is formed in the male cone housing 5. In another embodiment, the pins 50 could be formed or disposed in the female interlock aperture 32 and the male interlock aperture 12. In another embodiment the pins 50 could be formed as part of the female cone housing 20 (or alternatively female socket 2) and formed as part of the male cone housing 5.

The seal mechanism 43 interlocks and locates the male coupling assembly 1 with the female coupling assembly 3. The male flow holes 11 disposed in the male cone housing 5 of the male coupling assembly 1 and the female flow holes 23 disposed in the female cone housing 20 (or in an alternative female socket 2) can be rotatably aligned and located with the seal mechanism 43. The seal mechanism 43 also docks the female coupling assembly 3 and male coupling assembly 1 together, docking the male cone housing 9 with the female cone housing 20, so that the male cone housing and the female cone housing are removably and rotatably interlocked so that the male cone housing and the female cone housing rotate substantially in unison, and remain stationary substantially in unison. The interlock mechanism also fixes the female cone housing 20 and the male cone housing 9 together so that the female cone housing 20 and the male cone housing 9 rotate or remain stationary (fixed) relative to the interlocked female cone 21 and male cone 9. In the embodiment shown in FIG. 8, the male flow holes 11 of the male cone housing 5 and the female flow holes 23 of the female cone housing 20 are aligned and fixed relative to each other and in combination fixed (non rotatable) relative to the rotatably interlocked male cone 9 and female cone 21.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A refrigerant system quick connect coupling, said coupling comprising:

a female coupling assembly including;

a female cone housing;

a female cone nestable with said female cone housing;

at least one female flow hole formed in said female cone housing, and at least one female flow hole formed in said female cone, a male coupling assembly including;

a male cone housing;

a male cone nestable with said male cone housing;

at least one male flow hole formed in said male cone housing, and at least one male flow hole formed in said male cone;

said at least one female flow hole rotatably misaligns to fluidly seal, wherein said fluid is contained from leaking past said female coupling assembly; said at least one male flow hole rotatably misaligns to fluidly seal, wherein said fluid is contained from leaking past said male coupling assembly; said male coupling assembly being removably rotatably insertable into said female cone such that rotation in one direction fluidly couples said female coupling assembly and said male coupling assembly, thereby creating a fluid flow path through said quick connect coupling; and rotation in an opposite direction fluidly uncouples said male coupling assembly and said female coupling assembly, thereby sealing said fluid flow path through said quick connect coupling; and said male coupling assembly and said female coupling assembly are adaptable to be removably uncoupled.

2. The coupling of claim 1 further comprising:

a cone alignment pin disposed in said female cone received by a male coupling assembly tip disposed in said male cone to interlock said male cone and said female cone facilitating rotatable alignment of said at least one male flow hole and said at least one female flow hole wherein alignment of said at least one male flow hole with said at least one female flow hole fluidly couples said male coupling assembly and said female coupling assembly.

3. The coupling of claim 1 further comprising:
a female cone retention clip, mounted in said female coupling assembly, retaining said female cone receivably coupled to said female cone housing.

4. The coupling of claim 1 further comprising:
a male cone retention clip, mounted in said male coupling assembly, retaining said male cone and said male cone seal receivably coupled to said male cone housing.

5. The coupling of claim 1 further comprising:
a female cone seal disposed around said female cone, said female cone housing and said female cone are coupled with said female cone seal sealing between said female cone housing and said female cone, said female cone seal includes at least one female flow hole disposed therein; and
a female flow cavity formed within said female cone housing.

6. The coupling of claim 1 further comprising:
a male cone seal disposed around said male cone, said male cone housing and said male cone are coupled with said male, cone seal sealing between said male cone housing and said male cone, said male cone seal includes at least one male flow hole disposed therein; and
a male cone housing seal disposed on said male cone housing, said male cone housing seal is coupled to a female seat formed on said female cone for removably sealing said male coupling assembly with said female coupling assembly.

7. The coupling of claim 1 wherein said quick connect coupling is capable of being adaptable for use with small diameter tubing of about ¼ inch diameter.

8. The coupling of claim 1 wherein said female coupling assembly and said male coupling assembly receivably couple to fluidly couple in a manner that said male coupling assembly and said female coupling assembly rotatably align so that a female flow cavity disposed in said female cone housing and said at least one female flow hole disposed in said female cone housing communicate and, said at least one female flow hole disposed in said female cone housing, and said female cone, rotatably align with said at least one male flow hole disposed in said male cone housing, and said male cone, thereby creating a fluid flow path through said quick connect coupling; and
said female coupling assembly and said male coupling assembly fluidly uncouple in a manner that said male coupling assembly and said female coupling assembly rotatably misalign said at least one female flow hole and said at least one male flow hole, thereby sealing said fluid flow path through said quick connect coupling.

9. The coupling of claim 1 wherein said male coupling assembly forms a right circular cylinder shape and said male cone forms a cylinder shape; and
said male cone housing receivably couples to said cylinder shape of said male cone, and said female cone is a cylinder shape and said female cone housing is formed to receive said cylinder shaped female cone.

10. The coupling of claim 9 wherein said female coupling assembly receivably couples with said right circular cylinder shape of said male coupling assembly and said female cone forms a cone shape; and
said female cone housing receivably couples to said cone shape of said female cone.

11. The coupling of claim 1 wherein said male cone is forced by fluid pressure against said male cone housing; and
said female cone is forced by fluid pressure against said female cone housing.

12. The coupling of claim 11 wherein said fluid pressure wedges said male cone into said male cone housing; and fluid pressure wedges said female cone into said female cone housing.

13. The coupling of claim 1 further comprising:
a seal mechanism coupled to said female coupling assembly and said male coupling assembly; wherein said seal mechanism minimizes fluid leakage from said quick connect coupling.

14. The coupling of claim 13 wherein said fluid leakage is maintained at a very low leak rate of less than 0.1 ounce per year.

15. The coupling of claim 13 wherein said seal mechanism has a shroud body disposed around said female coupling assembly and said male coupling assembly; and
a cam mechanism coupled to said shroud body and said female cone housing for coupling said seal mechanism to said female coupling assembly and said male coupling assembly.

16. The coupling of claim 15 further comprising:
a female soft seat formed on said female coupling assembly for seating said seal mechanism;
a male seal ring formed on said male cone housing for seating said seal mechanism;
a first washer disposed between said shroud body and said female soft seat;
a second washer disposed between said shroud body and said male seal ring; and
said first washer is driven into said female soft seat and said shroud body; and
said second washer is driven into said male seal ring and said shroud body to seat said seal mechanism to said female coupling assembly and said male coupling assembly.

17. The coupling of claim 16 further comprising:
a high reliability seal formed by said first washer being driven into said female soft seat and said shroud body by said cam mechanism and by said second washer being driven into said male seal ring and said shroud body by said cam mechanism.

18. The coupling of claim 17 further comprising:
at least one pin disposed between said seal mechanism and said female coupling assembly and at least one pin disposed between said seal mechanism and said male coupling assembly; said pin interlocks said female coupling assembly and said male coupling assembly wherein, said female cone housing and said male cone housing are interlocked and said female flow holes disposed in said female cone housing and said male flow holes disposed in said male cone housing align.

19. The coupling of claim 17 wherein both said first washer and said second washer form lozenge cross sections; and
both said male seal ring and said female soft seat are a soft metal material with a hardness less than said first washer and said second washer, wherein, said male seal ring and said female soft seat deform around said first washer and said second washer, respectively when said first washer and said second washer are forced into said male seal ring and said female soft seat, respectively.

20. A refrigerant system quick connect coupling, said coupling comprising:

a female coupling assembly including;
a female shell disposed around a female socket forming a female flow cavity, said female socket receivably encloses a female cone with a female cone seal disposed around said female cone, said female socket and said female cone are coupled with said female cone seal, sealing between said female socket and said female cone;
a plurality of female flow holes formed in said female socket, said female cone and said female cone seal, said female flow holes fluidly couple to said female flow cavity, and said female flow holes fluidly uncouple from said female flow cavity;
a female cone cavity formed in said female cone;
a male coupling assembly removably rotatably inserted into said female cone cavity; said male coupling assembly having a male cone housing receivably enclosing a male cone with a male cone seal disposed around said male cone, said male cone housing and said male cone are coupled with said male cone seal sealing between said male cone housing and said male cone;
a plurality of male flow holes formed in said male cone housing, said male cone and said male cone seal;
a male cone housing seal disposed on said male cone housing coupled to a female seat formed on said female cone for removably sealing said male coupling assembly with said female coupling assembly;
said female flow holes rotatably misalign to fluidly seal, wherein said fluid is contained from leaking past said female coupling assembly;
said male flow holes rotatably misalign to fluidly seal, wherein said fluid is contained from leaking past said male coupling assembly;
said female coupling assembly and said male coupling assembly receivably couple to fluidly couple in a manner that said male coupling assembly and said female coupling assembly rotatably align so that said female flow cavity and said female flow holes disposed in said female socket communicate and, said female flow holes disposed in said female socket, said female cone and said female cone seal, rotatably align with said male flow holes disposed in said male cone housing, said male cone and said male cone seal, thereby creating a fluid flow path through said quick connect coupling;
said female coupling assembly and said male coupling assembly fluidly uncouple in a manner that said male coupling assembly and said female coupling assembly rotatably misalign said female flow holes and said male flow holes, thereby sealing said fluid flow path through said quick connect coupling; and
said male coupling assembly and said female coupling assembly are adapted to be removably uncoupled.

21. A method of using quick connect coupling, said method comprising:
inserting a male coupling assembly removably rotatably into a female coupling assembly adapted to removably rotatably receive said male coupling assembly; said male coupling assembly having a male cone housing receivably enclosing a male cone with at least one male flow hole formed in said male cone housing; said female coupling assembly including; a female cone housing, said female cone housing receivably encloses a female cone; at least one female flow hole formed in said female cone housing and said female cone;
coupling said male coupling assembly with said female coupling assembly, wherein said male coupling assembly and said female coupling assembly are removably rotatably coupled;
docking said male cone with said female cone wherein said male cone and said female cone are removably and rotatably interlocked so that said male cone and said female cone rotate substantially in unison;
aligning said at least one female flow hole with said at least one male flow hole wherein a fluid is coupled to flow through said at least one male flow hole and said at least one female flow hole;
misaligning said at least one female flow bole and said at least one male flow hole wherein said fluid is sealed from flowing past said female coupling assembly and said male coupling assembly;
undocking said male cone and said female cone;
uncoupling said male coupling assembly from said female coupling assembly wherein said male coupling assembly is removed from said female coupling assembly.

22. The method of claim 21 wherein during aligning said at least one female flow hole with said at least one male flow hole, when a fluid is coupled to flow through said at least one male flow hole and said at least one female flow hole, further comprising;
fixing said female cone housing and fixing said male cone housing relative to each other;
rotating both interlocked said female cone with said male cone until said at least one female flow hole aligns with said at least one male flow hole wherein said fluid is coupled to flow through said at least one male flow hole and said at least one female flow hole.

23. The method of claim 21 wherein during misaligning said at least one female flow hole with said at least one male flow hole, when said fluid is sealed from flowing through said male coupling assembly and said fluid is sealed from flowing through said female coupling assembly, further comprising;
fixing said female cone housing and fixing said male cone housing relative to each other;
rotating both interlocked said female cone with said male cone until said at least one female flow hole misaligns with said at least one male flow hole wherein said fluid is sealed from flowing through said male coupling assembly and said female coupling assembly.

24. The method of claim 21 wherein inserting said male coupling assembly into said female coupling assembly is done with a zero insertion force.

25. The method of claim 21 further comprising:
docking said male cone housing with said female cone housing wherein said male cone housing and said female cone housing are removably and rotatably interlocked so that said male cone housing and said female cone housing rotate substantially in unison.

26. The method of claim 21 further comprising:
disposing a seal mechanism, having a shroud body and a cam mechanism disposed on said shroud body, around the coupled said female coupling assembly and said male coupling assembly;
coupling said seal mechanism to said male coupling assembly and said female coupling assembly;
seating said seal mechanism to said male coupling assembly and said female coupling assembly with said cam mechanism.

27. The method of claim 26 further comprising:
  inserting a first washer between said shroud body and said female coupling assembly and a second washer between said shroud body and said male coupling assembly;
  seating said seal mechanism to said female coupling assembly and said male coupling assembly;
  driving said first washer into both of said shroud body and said female coupling assembly and driving said second washer into both of said shroud body and said male coupling assembly by caming said cam mechanism;
  forming a high reliability seal between said seal mechanism and both of said male coupling assembly and said female coupling assembly.

28. A method of using quick connect coupling, said method comprising:
  inserting a male coupling assembly removably rotatably into a female cone cavity formed in a female coupling assembly adapted to removably rotatably receive said male coupling assembly; said male coupling assembly having a male cone housing receivably enclosing a male cone with a male cone seal disposed around said male cone, said male cone housing and said male cone are coupled with said male cone seal sealing between said male cone housing and said male cone;
  a plurality of male flow holes formed in said male cone housing, said male cone and said male cone seal;
  said female coupling assembly including;
  a female shell disposed around a female socket forming a female flow cavity, said female socket receivably encloses a female cone with a female cone seal disposed around said female cone, said female socket and said female cone are coupled with said female cone seal, sealing between said female socket and said female cone;
  a plurality of female flow holes formed in said female socket, said female cone and said female cone seal, said female flow holes fluidly couple to said female flow cavity, and said female flow holes fluidly uncouple from said female flow cavity;
  coupling said male coupling assembly with said female coupling assembly, wherein said male coupling assembly and said female coupling assembly are removably rotatably coupled;
  docking said male cone with said female cone wherein said male cone and said female cone are removably and rotatably interlocked so that said male cone and said female cone rotate substantially in unison;
  aligning said female flow holes with said male flow holes wherein a fluid is coupled to flow through said male flow holes and said female flow holes;
  misaligning said female flow holes and said male flow holes wherein said fluid is sealed from flowing past said female coupling assembly and said male coupling assembly;
  undocking said male cone and said female cone;
  uncoupling said male coupling assembly from said female coupling assembly wherein said male coupling assembly is removed from said female cone cavity.

* * * * *